Oct. 31, 1939.  E. T. FERNGREN  2,178,393
PROCESS OF MAKING PLASTIC FILM ARTICLES
Filed Jan. 12, 1932  3 Sheets-Sheet 1

INVENTOR
Enoch T. Ferngren

Oct. 31, 1939. E. T. FERNGREN 2,178,393
PROCESS OF MAKING PLASTIC FILM ARTICLES
Filed Jan. 12, 1932 3 Sheets-Sheet 2
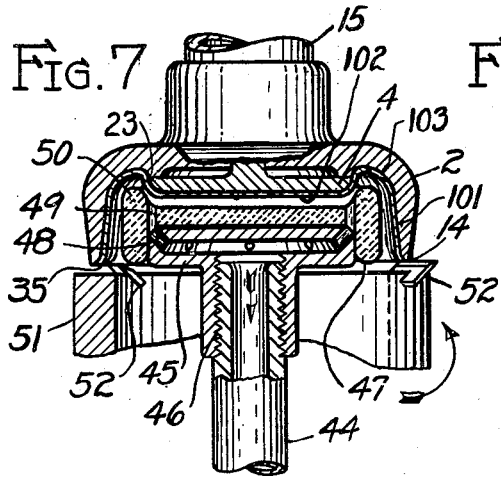
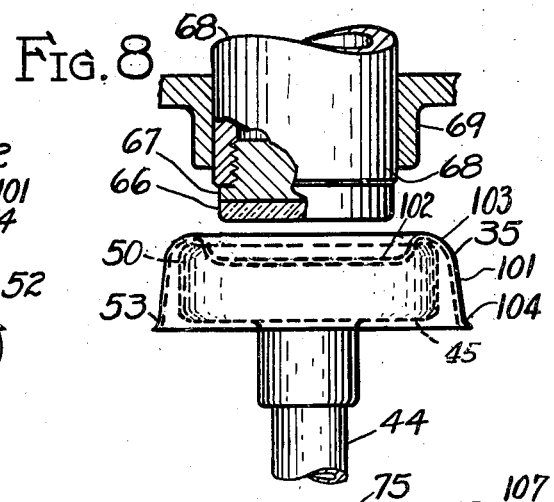
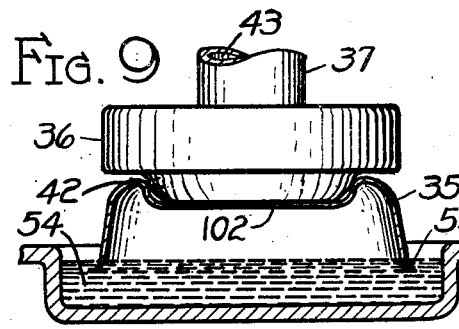
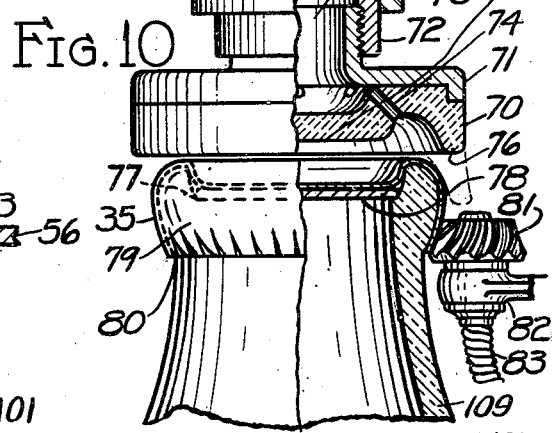
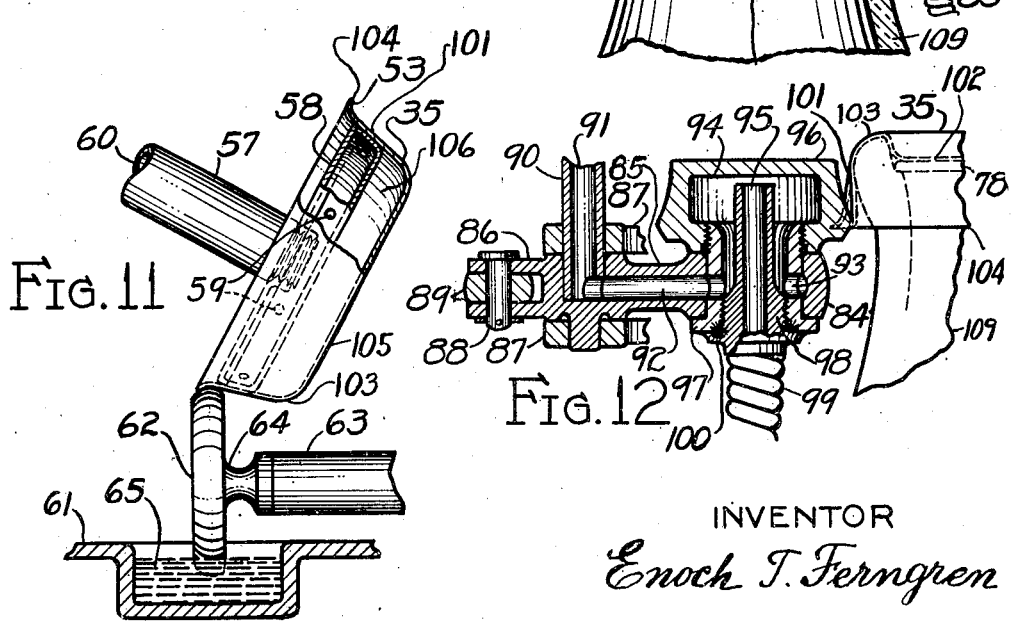
INVENTOR
Enoch T. Ferngren Oct. 31, 1939.  E. T. FERNGREN  2,178,393
PROCESS OF MAKING PLASTIC FILM ARTICLES
Filed Jan. 12, 1932   3 Sheets-Sheet 3
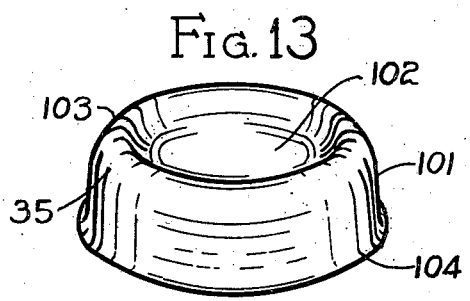
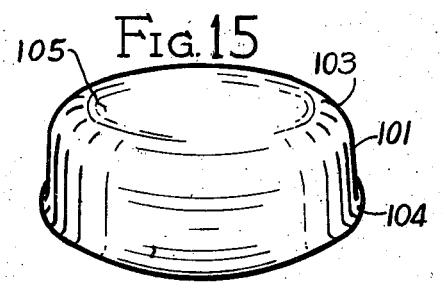
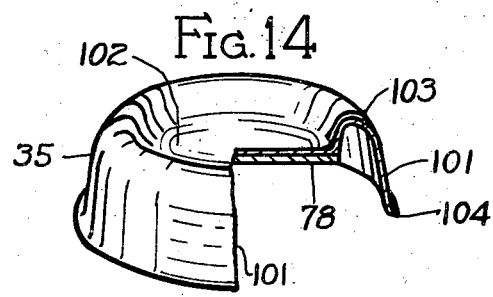
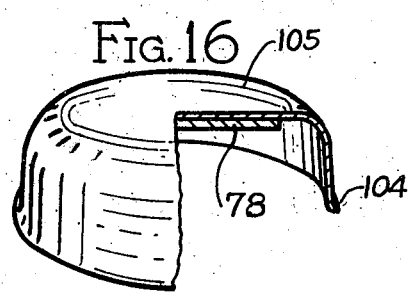
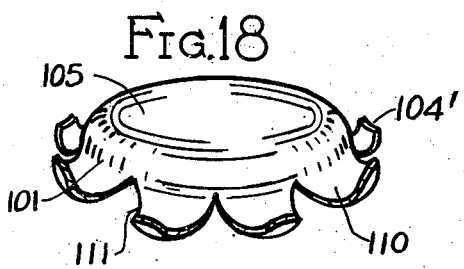
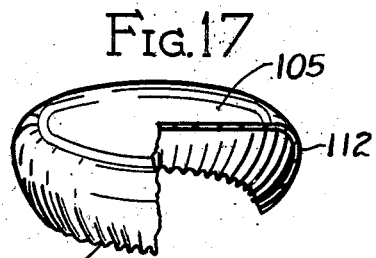
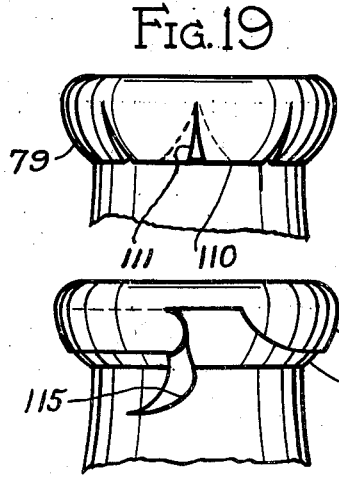
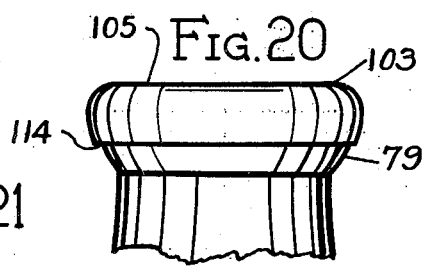
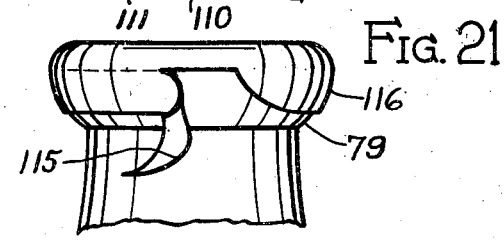
INVENTOR
*Enoch T. Ferngren*

Patented Oct. 31, 1939

2,178,393

UNITED STATES PATENT OFFICE 2,178,393

PROCESS OF MAKING PLASTIC FILM ARTICLES

Enoch T. Ferngren, Toledo, Ohio, assignor, by mesne assignments, to Plax Corporation, Hartford, Conn., a corporation of Delaware Application January 12, 1932, Serial No. 586,184

20 Claims. (Cl. 18—55)

This invention relates to a process of molding plastic materials into articles of hollow form, such as cups, milk bottle caps, bags, cartons etc.

The invention also relates to methods of treatment of fluent coatings on molding surfaces to expedite the drying or congealing of the film into a suitable solid state and the recovery of solvents therefrom.

The invention further relates to new methods of removing hollow molded articles from molding implements.

The invention also includes a novel procedure of gum-coating the edges of molded hollow articles, such as milk bottle caps, a novel procedure of printing the same and of nesting the articles in progressive order, as they are made.

With relation to specific articles, a number of different types of sanitary milk bottle caps are shown in the accompanying drawings, some of which are entirely new in their relation with a bottle mouth and otherwise meritorious for their intended uses.

The invention also concerns the incorporation of bacteria-destroying ingredients into the plastic material used, so as to afford the dairy industry and the public additional safeguards.

The various caps shown, which may be made according to this or related processes, are to be molded or formed from various plastic materials in a fluent or dispersed state with solvents and plasterizers, or from any transparent material which can be maintained in a fluent state, either by heat or by solvents. Cellulose acetate or nitro cellulose, properly plasticized and in solution in one or more suitable solvents, are the preferred types of the cellulosic plastics that may be molded according to this process, but many other types of transparent or translucent plastics are now also available on a commercial basis, such as amino plastics, paraffin plastics, sugar plastics and other synthetically produced compounds and resins, which may be molded according to this process.

In the forming of film wall containers from materials in solution in a solvent or otherwise, it is an object of the present invention to deliver a specific quantity of the fluid material by a force feeding action as a single charge into a mold unit, the quantity being predetermined, with relation to the surface area of the mold which is to be covered thereby, the proportion of solids to solvents present, the viscosity of the solution and the thickness or weight of film required.

If the film wall is formed from a plastic material which is maintained in a fluid state by heat, the predetermined quantity to be charged into the mold will depend on the spreading capacity of the fluid as influenced by the temperature of the interior of the mold at the speed of rotation employed, with reference to the surface which is to be covered and the thickness of film deposit required. The object in this instance resides in coordinating the speed of rotation of the mold and its temperature according to the known requirements of the plastic material used.

Another object is to spread the plastic material in a substantially spiral path over the interior surfaces of a mold by a rotational action of the mold, which is caused to be slow or fast, intermittent or continuous, and during which time the mold may be held at different angles or oscillated or vibrated to suit the requirements for distribution of the plastic material placed therein, with relation to the amount of strength and thickness, it is desirable to impart to any one portion of a film article. In this connection, for instance, in the making of bags it is always desirable that additional strength be provided at the point where the bottom portion joins the sides accordingly the rotations or the angles at which the bag mold is held should be directed toward increasing the thickness at such point. Again, if a carton or bag be square in shape, intermittent movements both as to rotation and oscillation may be necessary to provide the desired strength at the corners. In the case of a cigar slipover cover or a milk bottle cap, where the greater strength must be placed in the region of the closed end, a continuous rotation with the mold oscillated between an upright and a partly inverted position will suffice.

Still another object of the invention resides in the method of treatment of the material for the speedy removal of solvents therefrom and to increase the density of the film.

In connection with the milk bottle caps shown herein, some of which have sunken center portions arranged to fit into an ordinary seating recess in the bottle mouth, the object is to shape the upper film wall to fit into the cavity above the seat edge so that the film will lie closely above the regular paper cap and thereby to avoid any possible fracture of the film wall by sharp particles of ice or other intrusive objects, and thus insure the certainty of a protective covering against contamination. However, in the case of more rigid caps, moldable by this process, when different sealing features are involved, or when reinforcing sealing disks are incorporated as a part of the sunken portion of the cap, the provision of a sealing feature at the seat edge is an object of the invention.

It may be noted that the sunken median disk-like section of the cap has rounded corners, or curved side walls, the object of this shaping being to avoid too close a fit with the inner side of the lip wall of a bottle, so that the air in this cavity may have clearance to escape during the entering of the plug-like section of the cap at the time of capping.

All the caps shown may be molded with sunken or depending portion; of course, they may also be manufactured without this feature, as required.

The sealing of the cap with the bottle mouth is effected largely at the top and outer side of the lip bead at the mouth of a milk bottle; but if the shape of the bottle mouth requires the sealing to be more effected at other points, such requirements may be accommodated by an appropriate change in the form of the cap.

As heretofore pointed out many different plastic materials may be used in the molding of tissue-like articles by this process, however, articles having much heavier walls, such as cartons, bottles, cans and boxes, may also be produced. Such articles may require much larger molds and different assemblies, but such changes will in no way impair or hinder the practice of the process and will come within the scope of this invention.

The invention will be understood from a consideration of the accompanying drawings which show by way of example several embodiments thereof. In the drawings:

Fig. 7 is a view principally in vertical section showing a recessed type of bottle-cap-moving suction head which is suited to take the cap directly from the mold, the rotary edge trimming means shown cooperating to cut away the lower marginal edge of the bottle cap from the outer edge of the mold;

Fig. 8 is a view principally in elevation, but with parts broken away and in vertical section, showing how a bottle cap may be printed or embossed while supported on the kind of a head shown in section in Fig. 7;

Fig. 9 is a view partly in vertical section and partly in elevation showing the bottle cap sustained by suction from a pick-up head while the lower edge of the cap is being immersed in a solution of rubber or some other gummy adhesive contained in a suitable receptacle;

Fig. 10 is a view partly in elevation and partly in vertical section of the upper end of a milk bottle with a molded cap positioned thereon, showing a rubber seating plug used for forcing the cap into place and holding it closely to the upper edge of the bead of the bottle while crimping rollers operate to stretch the film and conform it closely to the bead of the bottle;

Fig. 11 is a view partly in elevation and partly in vertical section illustrating the manner in which an adhesive or a colored coating may be applied to the outer side of the skirted portion of a milk bottle cap; a suction head member holding the cap while rotating it against the outer edge of a pick-up or transfer wheel, which is also rotated and which has its lower edge in contact with the material that is to be transferred to the cap;

Fig. 12 is a view principally in vertical section, but with some parts in elevation, showing a heated crimping roller operating on a skirted portion of a milk bottle cap to stretch or fold the same under the beaded portion of the milk bottle;

Figs. 13 and 14 are views in perspective, the latter having parts broken away and in section, illustrating bottle caps with a sunken or recessed center portion which is shown in Fig. 14 as being reinforced by the ordinary disk cap;

Figs. 15 and 16 are views similar to Figs. 13 and 14 respectively showing a type of milk bottle cap suited to be stretched across the top of a bottle, the section in Fig. 16 illustrating a reinforcing sealing pad formed as a part of the upper end thereof;

Fig. 17 is a view similar to Figs. 14 and 16 showing a molded cap with a crimped skirt;

Figs. 18 and 19 are views respectively in perspective and elevation showing a preferred type of cap where the skirted portion is divided into upwardly curved and flared portions which when reversed assume the shape shown in Fig. 19, fitting snugly around and under the bead of a bottle neck; and Figs. 20 and 21 are elevational views illustrating a form of cap which may be molded of any material, but preferably should be somewhat elastic in nature; the dotted line on the cap (Fig. 21) indicates a weakened line along which the cap may be split or torn when removing it from the bottle neck, this cap being also moldable with a diagonal split in its side wall and without any weakened or scored section.

In carrying out the process of molding a product such as coverall caps for milk bottles, the essential steps for certain types of caps are illustrated in Figs. 1 to 6, while modified process steps and other supplemental procedures, up to the point of locating a cap on a milk bottle are shown in Figs. 7 to 12. The type of cap shown in Figs. 13 and 14 may be formed in the mold shown.

Figure 1:
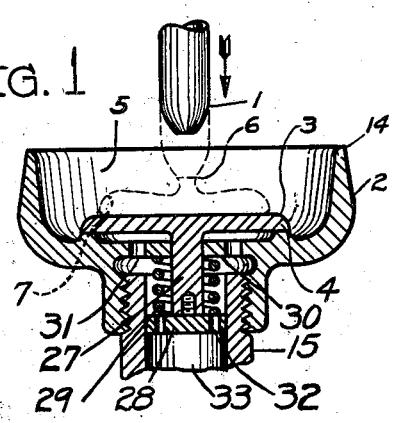
Figure 1 is a vertical sectional view of a mold assembly for producing milk bottle caps, showing the position of the charge feeding nozzle, before delivery of plastic material.
Figure 2:
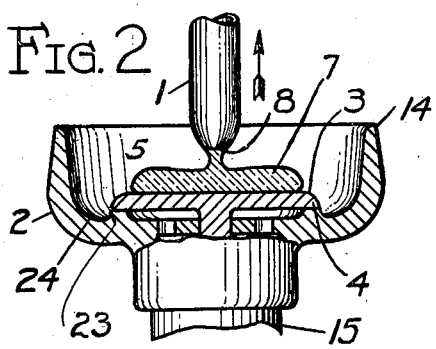
Fig. 2 is a similar view of the mold with the feed nozzle in the position it occupies after it has delivered a charge of material into the mold and prior to its upward recession from the mold.

As shown in Fig. 1 a feed nozzle 1 is located above a mold 2 relatively close to its upper edge 14, the dotted line indicating the limit of approach into the mold of the nozzle 1 at time of charging, the charge being received on the surface 3 of a valve head 4, which forms the central raised portion of the mold cavity 5.

When the nozzle 1 has descended into the cavity 5 to the point 6, a measured charge 7 of film-forming material, comprising a cellulose derivative composition, or any other suitable plastic material in a fluent state, is extruded from the nozzle, which then is elevated to a point as shown in full lines in Fig. 1. To avoid dripping or other discharge by gravity, the plastic material at the discharge opening 8 of the nozzle is instantly withdrawn upwardly into the nozzle once the extruding impulse is terminated.

Figure 3:
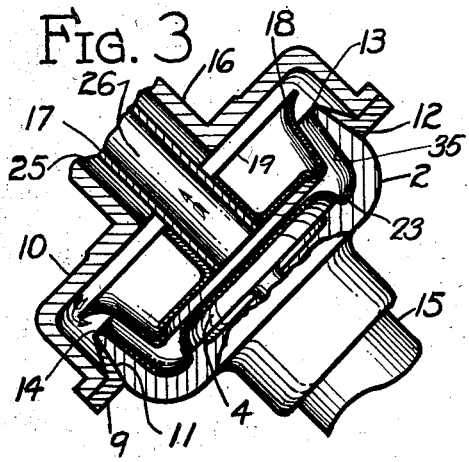
Fig. 3 is an assembly view substantially in central vertical section showing the drying cup and its associated parts as they are positioned during the early period of the rotation of the mold and the extraction of solvents from the plastic material.

The charge 7 being received, the mold 2 is rotated, while an edge holding ring 9 and a drying cup housing 10 are immediately assembled thereon to form an air-tight chamber, as shown in Fig. 3.

Both the ring 9 and the cup-shaped housing 10 are pressed against the outer conical surface 11 of the mold 2, which acts as a clutch, causing the cup and the ring to rotate in unison with the mold, these parts being at this time in effect a part of the mold, the conical face 12 of the ring 9 engaging the surface 11 and the inner edge 13 of the ring 9 forming a continuation of the upper edge 14 of the mold.

The mold 2 is caused to revolve around its axis at any suitable speed by means of a tubular member 15 which is driven by suitable mechanism (not shown). The member 15 is slidably mounted in holding means, which are caused to impart any required tilting movement to the mold 2. The cup 10 and its associated parts are likewise caused to participate in the tilting and rotating movement of the mold. This rotating movement will cause the charge 7 of plastic material to be spread in a spiral fashion within the mold cavity 5. None of these mechanical parts are shown herein, but may be of any conventional or desired nature.

Figure 4:
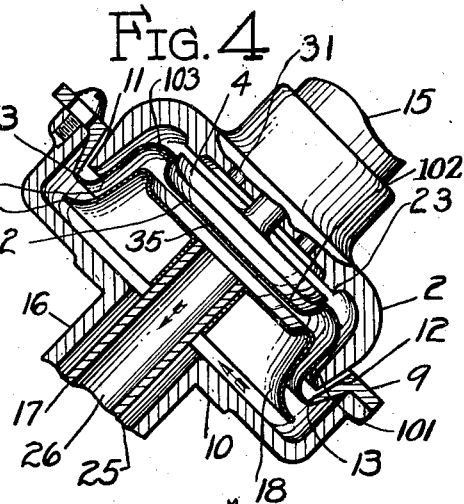
Fig. 4 is a view similar to Fig. 3 showing the relative position of the parts during the removal of the film bottle cap from the mold.

The drying cup 10 has a hollow stem 16 through which extends centrally a pipe 17. On the outer end of the pipe 17 is mounted an air deflecting member 18, which as shown in Figs. 3 and 4, is open at its wider end. This member may also be closed at its wider end as shown at 18' in Fig. 5, and will then function as a temperature controlling chamber to absorb or radiate heat as may be desired, in which case passages 20 and 21 provide means for circulating suitable fluid media therethrough.

As the mold charge 7 is being spread over the inner face of the mold 2 by the rotation of the mold, and so distributed that a thicker film layer will be provided over the valve head 4 and in an annular groove 24 of the mold, air or other gaseous medium is admitted through an annular passage 25 in the stem 16, which air is then forced or drawn out by vacuum applied through the passage 26 in the pipe 17.

The layer, of the charge 7, in the mold cavity 5 is caused to advance toward the edge 13 of the ring 9, but not beyond this edge, by bringing the mold 2 into the position shown in Figs. 3 and 4, during the rotation thereof. The air admitted through the drying cup 10 should be free from moisture to prevent any condensation of water during evaporation of solvents or during compression of the air.

After the spreading of the film in a manner such as to secure the required distribution thereof, it is exposed to a pressure and vacuum treatment, which may be modified, varied or applied intermittently to the film. Many solvents, if acted on too directly or intensely by a strong circulation of air, would tend to evaporate very quickly from the most exposed portions of the exterior skin of the film, thereby retarding the release of solvent from the protected main body of the film. To avoid such partial drying and to take full advantage of the vapor pressure of solvents in the film it is preferable to reduce the atmospheric pressure in the mold cavity directly outside of the film coating, while at the same time either maintaining a reduced circulation of air, or intermittently circulating air, followed by rapid increases of pressure of momentary duration in that atmosphere which is in contact with the film.

Increased pressure intermittently applied against the film has a tendency of wringing out or separating the solvents from the solid material of the film, bringing a greater amount thereof near the surface of the film. If the pressure is reduced below that of the atmosphere at this point of the operation, a considerable part of the solvents will evaporate. If this alternating pressure treatment is continued, the film is quickly freed of solvents and the solid portion thereof compressed and increased in strength, flexibility and density.

The treatment of a fluent plastic film by means of a compressible fluid also tends toward the prevention of any creeping tendency in the fluent film. In the forcing out of solvents from the solid material, relatively dry air, which has been cooled and suitably compressed, is admitted through the passage 25 or 26, as the case may be, and brought into contact with the plastic coating which has been spread on the walls of the mold. This pressure action, which may be progressive in its nature, from a low to a high pressure, has the tendency to hold the coating rigidly in contact with the wall of the mold. When the negative pressure condition is brought about, the tendency is to increase the rate of release of the solvents. The action of the pressure when it is reduced to some negative value should be accompanied by a slow circulation past the film in the mold, either toward the passage 26 or toward the outer rim 19 of deflector 18, and thence through the passage 25 to a suitable solvent recovery apparatus (not shown).

During the foregoing procedure, it will be advantageous to control the temperature of the molds and the air conducting means used. In this connection, it should be noted that the air stream used and circulated past the fluent film should be properly controlled as to temperature.

The effect on the solvents of the variations of the pressure and sometimes of the temperature is to cause an increased or intensified rate of removal of solvents as a relatively thick vapor from the viscid plastic material, which speedily looses its fluency. Repetition of this differential pressure treatment, with or without a very rapid movement of air over the film, will result in a stable film practically free from solvents, and from which remaining traces of odors may be removed by a subsequent flow of air through the space between the deflector 18 and the exposed surface of the film. In this connection it should be noted that the deflector 18 is shaped to promote a uniform sweep of air at all points of the mold cavity, independently of the direction of the air current.

If a subsequent heat treatment of the film should be desirable for any reason, the molds and the air used may be heated. If a material such as rubber or a rubber compound is to be molded by this process, the air may be heated to effect a curing or vulcanization of the layer of rubber in the mold, while the differential pressure treatment is valuable to increase the density and remove pin holes and other defects. If a plastic material is of a nature to be solidified by heat and pressure applied simultaneously thereto, this process affords every facility for such treatment, as the molds may be heated in any well known way and the fluid temperature controlling media may be of a liquid nature, if so required for certain treatments where high heat conductivity is essential, in which case the pressure would be hydraulic instead of pneumatic.

In the event that a plastic material is employed which will require chemical action for its coagulation instead of heat and pressure, or the vacuum treatment as above set forth, modifications in construction may be resorted to, such as minute perforation of the valve head 4 by which the film may be given the necessary treatment from its rear side during the coagulation period.

Again, if a molten plastic is used from which no dispersing agent or volatile material needs to be extracted, nor any chemical reactions established, the compressed air employed should preferably be heated to the same temperature as the molten plastic material, when it is first admitted to the mold cavity 5 during or following the first spreading of the hot charge. Increased temperatures of the air and the mold used, with proper regard to the peculiarities of the plastic material employed, will aid in developing the right amount of mobility in the charge, during the spreading period as the mold is rotated with the air admitted through the center of the cup from passage 26, but thereafter the air may be swiftly cooled in order rapidly to solidify the fluent material.

When the film on the mold 2 becomes solid, its removal from the mold may be accomplished partly by mechanical action and partly by pneumatic actuation, or the employment of a suitable vacuum action through the passage 26, to establish a low pressure atmosphere on one side of the film while a slightly compressed atmosphere is introduced through a passage 33 in contact with the rear side of the film.

The valve head 4, which forms the central bottom portion of the mold cavity 5, has a stem 27 provided with a spring retaining head 28 at its lower end. This stem and the head 28 are movable as a unit in the passage or bore 33 of the member 15. A compression spring 29 is located between the retaining head 28 and a perforated partition 30 of the mold, by which expedients the head 4 is kept in close contact with the cylindrical seat edge 23.

The operation of releasing a film cap 35 from the mold comprises slightly raising the valve head 4 from the seat edge 23 by the action of compressed air supplied through the passage 33 in the member 15 and thence through small passages 32 and 31, while coincident therewith vacuum is applied through the passages 25 and 26, or through one of these passages, while the other one is closed off. This results in the lifting or separation by differential pneumatic pressure of the skirted portion 101 of the film cap from the annular groove 24 to the upper edge 14 around the side wall of the mold. As this takes place, the cup 10 and the attached edge 13 of the ring are moved slightly outwardly, away from contact with the surface 11 of the mold, placing the film wall at the edge 14 under an outwardly stretching strain, as the air from beneath the valve head moves along the side of the mold toward the edge 14, with the result of freeing the film from the edge 14. At this instant the movement of air from the tubular member 15 is nearly discontinued as the spring 29 is no longer compressed with sufficient force to maintain an open space between the lower face of valve 4 and the seat edge 23, with the result that the valve head 4 immediately snaps into its closed position, while the air between the skirted portion of the cap and the mold will strip the sunken portion 102 of the cap from the surface 3 of the valve head 4. The application of vacuum through the passages 25 or 26 is discontinued as the valve 4 resumes its normal position; and air under a slight pressure should then be injected from the passage 25 and around the deflector 18 toward the curved portion 103 of the cap and thence outwardly through the passage 26, so as to maintain the cap 35 in proper shape, as shown in Fig. 4.

Figure 5:
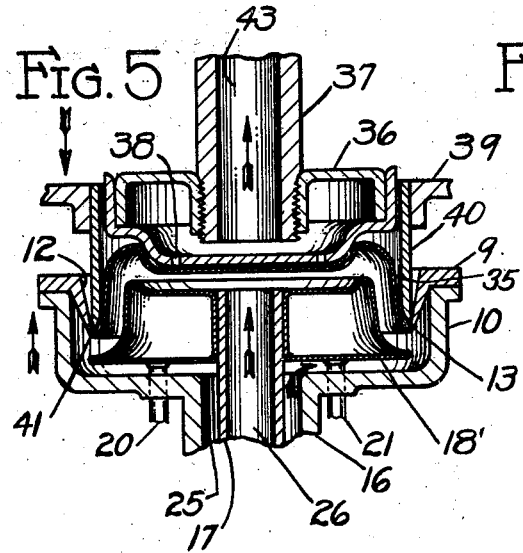
Fig. 5 is an assembly view substantially in vertical section showing the drying cup and the edge-holding ring in relation to the edge cutting means and the suctional pick-up head at the instant of severance of the bottle cap from the edge ring.
Figure 6:
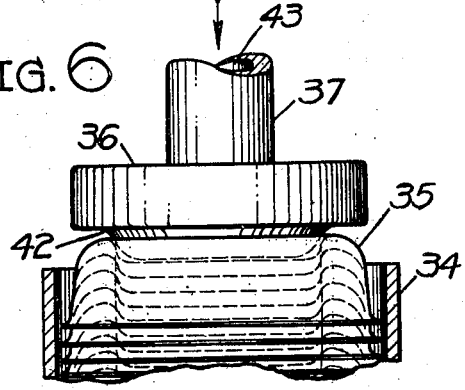
Fig. 6 is a view principally in elevation and partly in vertical section showing a suction head or pick-up as it is positioned after it has transported a bottle cap and nested the same.

The cup 10 and the ring 9 are now brought into the position shown in Fig. 5, where a pick-up or transfer head 36 is brought into contact with the sunken portion 102 of the cap, and a cylindrical cutter 40 is brought into close proximity with the edge 13 of the ring 9. During this time the film cap is still attached to the edge 13.

The transfer head 36 is carried by a tube 37 having a passage 43 therethrough which is connected by other conduits and valve arrangements (not shown) to any suitable air exhausting and air compressing devices. The arrangement is such that when the head 36 is brought into alignment with the ring 9 and the cup 10, air is partly exhausted from the hollow interior of the head through the passage 43, which draws air through bores or passages 38 in the head and attracts and holds the portion 102 of bottle cap thereto.

Air under slight pressure is now preferably admitted through the passages 25 and 26 to distend the cap 35 outwardly, while a part 39 which carries the cutter 40 is either given a downward or the cup 10 an upward movement, thereby causing the cutting edge 41 to loosen, strip or cut away the outer edge of the flared film portion 104 of the cap 35 from the holding edge 13 of the ring 9.

The completed cap is now carried by the head 36, first upwardly and outwardly through the cutter 40, and thereafter to a stacking device or paper tube 34, where the caps are nested; and a certain packing impulse is given as the cap is delivered from the head 36 by the release of compressed air from the series of passages 38, this air passing radially outwardly between the curve 42 of the head and the curved portion 103 of the cap.

In a case where plastic materials are used for molding hollow objects by this process, which do not require any edge holding parts such as the edge 13 of the ring 9, or if pressure treatment may be unnecessary, a rotary edge trimmer 51, such as that shown in Fig. 7, is associated with the edge 14 of the mold, the several shearing knives 52 being arranged at an angle relative to the edge 14, so as to cut or slit the film layer in a radial-tangential fashion with the cut moving from the inner side of the film outwardly along edge 14.

After this trimming action, a transfer head 45, which has a threaded connection indicated at 46 with a hollow pipe 44 and which is provided with a rubber cushion 47 having a raised corner brim 50 and passages 48 and 49, is elevated or otherwise concentrically inserted into the mold 2 to align the brim 50 with the curved portion 103 of the cap and to bring said brim close to the cap. At this time the air between the upper face of the head 45 and the film layer over the valve head 4 is evacuated by withdrawing air from the pipe 44 and the passages 48 and 49; while simultaneously compressed air is discharged between the seat edge 23 and the valve 4 advanced into the evacuated cavity inside the brim 50 at the top of the transfer head 45.

The compressed air issuing from beneath the valve 4 quickly releases the skirted portion 101 of the cap from contact with the wall of the mold. When the compressed air application is terminated, the valve head 4 separates the portion 102 of the cap from contact with the surface 3 of the valve head 4, this last stripping action being aided by the suction action from passages 48 and 49.

The main body of the mold 2 may be slowly moved rotationally an inch or two at its periphery as the valve head 4 is seated in the recess inside the brim 50 of the cushion 47, which will exert a tortional stripping pull on the skirted portion of the cap as the air is moving outwardly between this portion and the inner wall of the mold from beneath the valve head 4 to the edge 14.

The transfer member 45, to which the cap 35 is held by suction, is now moved downwardly and outwardly from the environs of the trimmer 51. The finished cap may now be stacked and nested in a fashion similar to that described with relation to Fig. 6, but the position of the cap is now reversed, that is, the small end thereof is now foremost when it enters the tube or is nested.

When it is required, the caps may be embossed or printed in one or several colors as they are carried outwardly by a transfer head such as the head 45, Fig. 8. The head moves the caps along a predetermined path during which a part 69, which serves as a carrier and guide for a reciprocating piston 68 is caused to come into alignment with the recessed or sunken portion 102 of the cap while moving in the same direction as the head 45.

Each piston 68 carries die parts 66 and 67, of which the part 66 may be an impression member. This member should preferably be formed of a fairly elastic or non-rigid compound when applying impressions to fragile or soft films. However, any suitable type of material may be used for this die member. When embossed or raised effects are wanted, the upper surface of the head 45 may be provided with an insert die of firmer or more rigid material.

The upper die member 66 may be heated to facilitate the draw in certain film materials and when coactive upper and lower impression members are used for obtaining different effects. The upper surface of the head 45 may also be a means for transferring a color pigment to the inner face of the film portion 102. In order to obtain two or three color effects the easiest procedure is to employ successive printing devices of the type shown in Fig. 8, which devices may be timed and synchronized by means to move at the same speed as the head 45 at the time of effecting a printing impression by the movement downward of the piston 68 or an upward movement of the head 45.

In order to provide a milk bottle cap suitable for all needs and uses and readily to seal it with the beaded portion of the neck of a milk bottle, a gum coating 53 may be applied to the flared edge 104 of the skirted portion 101 of the cap, in the way shown in Fig. 9 or 11. When a cap is carried by the transfer head 45, the angle of immersion or of association with a bath of gum or a gum-applying means may be different. In the event of applying a colored coating to the entire skirted portion of a cap, the angle may be such as to contact the entire outer side of the skirted portion with a coating 54, Fig. 9, while rotating the head 45.

When employing a transfer head 36, as shown in Fig. 9, a receptacle 56 may be used to contain a gum solution or appropriate gummy substance. When the head 36 starts to submerge the lower end of the cap 35 in the solution 54, the air inside the cap will prevent excessive coating on the inner side, the curved portion 42 of the head serving to support the curved portion 103 of the cap and the enclosed air serving further to improve stability. The manner of coating shown in Fig. 9 is best suited for caps which are to stick to the beaded portion of a milk bottle and form an air-tight seal therewith during the twisting or crimping of the skirted portion of the film around and under the beaded section 79 of the bottle.

The arrangement shown in Fig. 11 is the preferred form of applying an adhesive to the outer flared portion 104 of the skirted wall 101 of a cap. In this figure a suction member 58 is shaped to hold the skirted portion 101 of a cap, this member being carried by a rotatable hollow tube 57 and being caused to approach the periphery of a transfer wheel 62 which is rotated so as constantly to pick up a coating of material from a bath 65 thereof in a basin 61. The wheel 62 is rotated by means of a shaft 63, between which and the wheel is provided an annular recess 64 into which surplus material may drain from the side face of the wheel 62 and thence be deflected back into the bath 65 by any suitable means (not shown).

The coating 53 or gum deposit laid on the portion 104 of the cap may be varied as to thickness by the relative speeds of rotation of the member 58 and the wheel 62, so that great economy can be practiced in the amount of material transferred from the periphery of the wheel to the brim of any type of cap.

During the association of the member 58 with the inner side of a cap 35, suction ports 59 function to hold the cap securely as shown in Fig. 11, the amount of air exhausted through a passage 60 for effecting this purpose being relatively slight. When the cap is released from the member 58 by a reversal of the direction of the air flow through the pipe 57, the air passes from the hollow interior of member 58 through the ports 59 to the space 106 between the flat portion 105 of the cap and the member 58 and moves the cap outwardly.

If the cap is to be used directly after leaving a transfer member of any type, it may be received by a capping device such as that shown in Fig. 10. A cupped plug 70 formed of a resilient material is held and carried by a casing 71 secured to a reciprocating portion 72 operating in a sleeve or bearing 73. The plug 70 has air exhausting passages 74 communicating with a passage 75 in the portion 72 to hold a bottle cap by suction and also has a depending portion 107 to seat and press the sunken portion 102 of the cap into the recessed portion 77 at the mouth of the bottle.

A paper cap 78, Fig. 10, may be a substantially integral part of the cap portion 102 if provisions are made therefore during the molding of the cap prior to the spreading of the plastic material in the mold, such as a recess in the valve head 4 for receiving the paper disk and appropriate mechanisms for transferring and placing the paper disks 78 in such recess. However, the paper disk 78 may be attached to the cap portion 102 by any desired means after the cap has been molded or may be a separate object inserted in the bottle recess 77, before the molded cap is located therein or thereover. Both the paper disk and the outside cap may be forced into place in the recess 77 at the same instant to eliminate duplication of effort or two operations of capping.

The useful features of the plug 70 reside first in that the depending central portion 107 will locate the center portion 102 of the cap in the recess 77, while the suction effective through the passages 74 will pull the upper curved wall portion 103 of the cap slightly upwardly and away from the top end of the beaded section 79 of the bottle, allowing the escape of air from the recess 77, and secondly in that when the plug 70 is fully pressed down, the outer elastic wall portion 76 thereof is effective flexibly to grip and to urge the curved portion 103 of the cap downwardly where it joins the skirted portion thereof. This gives the cap a snug or tight fit over the beaded mouth of the bottle and holds the film comprising the outer cap portions without inflicting injury thereto during the subsequent rolling operation of twisting rollers 81 on the skirted portion 101 and the flared edge 104 of the cap.

Each roller 81, of which at least three should operate at the same time, is made of rubber, and as shown in Fig. 10, has been advanced to bear against the side wall 101 of the cap. Each roller is rotated by means of a flexible cable 83, and is advanced toward or away from the bottle neck by means of an arm 82, while simultaneously a rotational movement is given to the capping device and the bottle as a unit, either in the same, or in the opposite direction of rotation as or from the roller 81. The result of the combined stretching, twisting and folding action is about as shown at 80 in Fig. 10.

In Fig. 12 is shown an internally heated roller 96, for twisting and drawing the skirted portion of a cap around the bead 79 at the bottle neck. In order that the heat of the hollow roller 96 may have a softening effect on the film material of the wall 101 of the cap before the roller comes into actual contact therewith, from five to seven of these rollers should be provided and spaced equal distances apart from each other. These rollers should also be equally spaced from the neck portion of the bottle, so that a zone of sufficient heat radiation will be available to give pliancy to the materials which enter into the composition of or comprise the heat sensitive component of the wall portion 101 of the cap.

The hollow roller 96 is made of any suitable material, and may be provided with suitable diagonal grooves around its periphery. The roller is rotatable in a hub 84 of an arm 85 by means of a short tubular shaft 97, which is connected at its lower end to a nipple 98 secured to a hollow flexible tube 99 by means of a flange 100, welded to the shaft and to the nipple.

The nipple 98 has an upwardly extending tubular portion 95, which is spaced from the inner sides of the tube 97 and extends into a hollow space 94 within the roller 96.

The arm 85 is provided with projecting portions pivotally mounted in ring members 87 and has a split rearward extension 86 to which one end of an actuating arm 89 is pivoted by means of a pin 88. An inlet tube 90 passes through one of the ring members 87, this tube acting as a pivot pin for the upper end of the arm 85. The interior passage 91 of the tube 90 is connected with a horizontal passage 92 of the arm 85.

The tubular shaft 97 has several perforations 93, which communicate with an outer angular portion of the passage 92 in the hub 84, so that constant communication is provided between the interior of the shaft 97 and the passages 91 and 92. Steam or other heat conducting media may be caused to advance through the connected passages into the cavity 94 of the roller 96 and thence outwardly through the tube 95 and the flexible tubing 99, the roller 96 being sufficiently heated as to be capable of reshaping the skirted portion 101 of the cap so that it will take on and permanently hold the same shape as the bottle bead or neck surface along which it is drawn, wrapped, stretched and/or folded by the action of the rollers, mechanically and/or by heat.

Each roller 96 is rotated by the flexible tubing 99 and is brought forwardly into contact with the cap and the bottle neck by a tangential thrust of the arm 89 alongside the ring 87. The bottle 109 may be held stationary if the ring 87 which carries the several rollers at equal distances around the bottle neck is rotated or the bottle may be slowly rotated by the action of the several rollers 96, such rotation of the bottle being partly resisted with a breakshoe action on the outside of the bottle or on its holding parts. The rotation of the bottle and the capping device as a unit may, if desired, be independent of the rollers.

The several bottle caps shown can all be molded according to the process herein disclosed, although other processes may also be employed in their final shaping and handling. Figs. 13 to 16 show caps which must be reshaped in their skirted portions to fit the necks of different types of bottles or containers, while Figs. 17 and 21 represent caps not entirely within this class. The caps shown in Figs. 18, 19 and 20, on the other hand, need no reshaping to fit over the beaded lip of an ordinary milk bottle.

The cap shown in Fig. 18 represents the most pronounced outward flare at the edge, and has the advantage, when stacked or nested, of being more easily picked up and separated from the stack by mechanical means than any other type. The skirted portion 101 of this cap which is divided into a series of cupped sections or flounces 110, will, when reversed or turned downwardly, fit around the beaded portion 79 of a bottle with a fair degree of inherent grip, as shown in Fig. 19. Many varieties of caps can be made with an elastic or a partly adhesive film; also, latex compounds may be used which can be vulcanized in the mold, providing satisfactory, easily attached and well fitting caps, printed or otherwise, and in many colors.

The mold used in forming the cupped sections 110 may be of the open type with a side wall brim formed to shape each section. The edge cutting member used for this cap when trimming the edges from the ring 9 associated with the mold is shaped to cut out the intervening film portions along the outline shown in Fig. 18. The mold may also be of the narrow mouth type with an opening of the same or a smaller diameter than the narrow portion of the bottle neck below the bead 79. The separate sections 110, which when turned upwardly take on the shape shown in Fig. 18, may be molded in the shape and position of the cap shown in Fig. 19 and cut apart after molding as shown when they are trimmed from the edge holding element. These cupped sections 110 may be so arranged or molded with relation to one another and to the bottle neck bead, that the adjacent edges 111 will overlap as indicated by dotted lines in Fig. 19.

The outwardly flared ends 104' of the cap, shown in Fig. 18, may if required be coated or tipped on their extreme points, which will form their inner side when turned downwardly, with any suitable adhesive, as illustrated in Figs. 9 or 11, or may be coated en-masse, when stacked or nested.

The cap shown in Fig. 17 molded with a crimped edge 113, the object being to provide a cap which will normally hug the incurving side of the bead 79 of the bottle. When this cap is slipped over the upper end of a bottle, the crimped folds below the point 112 of the skirt thereof may be readily flattened out by any smoothing or clamping device.

The cap, shown in Fig. 20, is adapted to fit closely over the widest portion of the bead 79 of a bottle and to come down to and closely fit a reduced diameter portion of the bead at the point 114 of the cap. A cap of this shape can readily be put on by fitting one side of the wall 114 well down over to one side of the bead 79, and then executing a "rocking chair" movement with the cap from the low point forwardly, while pressing downwardly on the head 79. The cap will then slip down over the widest portion of the bead. Aside from the assistance given by the outline of bead of the bottle the enclosed air presumably assists in distending the cap material as it passes over the widest point of the bead.

The cap shown in Fig. 21 is molded to fit further down on the bead of a bottle and is more difficult to put on unless it is provided with a scored side wall section, which will permit the distension of the side wall 116 adjacent to the scored portion 115, which will open up under the downward pressure when the cap is forced over the bead 79 of the bottle to the position shown in Fig. 21. This scored portion or section 115 of the side wall of the cap may also be cut as shown. When removing a cap of this nature from a bottle neck, the section 115 and the remaining score line provides an easy way of lifting the cap from the bottle. The inner side of the section 115 may be gum-coated at its edge, or the cap may be made of a composition which will normally adhere to the glass when pressed thereagainst.

The various bottle caps, described above, may be interchanged and so related as to serve other uses and needs in bottle covers. For instance, the cap shown in Fig. 20 may be provided with an outwardly flared lower edge such as is provided on the cap 35, Fig. 13, in order to facilitate its nesting, handling and use, as stated in the introduction of the specification relating to the object of this particular feature of the invention. Again, a universal cover all transparent cap shown in Figs. 11 and 15 may be given an opaque coating along its curved portion 103 and side wall or skirted portion 101 in any color or metallic luster, leaving its center portion 105 clear and transparent, so that merchandise or food may be inspected therethrough. Such a cap if made in different dimensions will find use as a cover for a large number of bottles and wide mouth jars.

The process of this invention is capable of variations in its steps for instance, if a deep mold is used it will aid operations if the mold be suddenly charged with a larger quantity of the plaster material than is required, while spinning the mold more or less for an instant, and then immediately withdrawing a known surplus quantity of the plastic material from the mold 2 into the charging nozzle 1. The ring 9 used for lifting out the film container may have a much wider surface at its edge 13. Further, the ring 9 may be detachably carried by the mold 2, instead of by the cup 10.

Various changes within the scope of the appended claims may be made in the process of the invention as well as in the construction, form and arrangement of parts of the apparatus used, for practicing the same without departing from the spirit of the invention or sacrificing any advantage thereof.

Having thus described my invention, I claim:

1. The method of removing the solvent component from a plastic compound which is spread as a film coating on a rigid surface, which comprises causing an intense radiation of heat energy from a closely positioned solid surface to penetrate the body of the coating to expand and soften the plastic compound and vaporize the solvent component, while exposing the exterior of the coating to a cooled solvent-vapor-condensing and moving atmosphere which is caused to move in the space between the coating and the said heat radiating solid surface and to operate recurrently first with a negative and then with a positive pressure relative to the film on the rigid surface.

2. The process of producing caps for bottles and the like from mobile plastic masses having fluent components, which comprises dropping a mass of predetermined quantity as a unit body onto the central portion of a rotating cap-mold, sealing the mold and spinning the mass to extend the same as a unit coating along the sides and onto the edge of the mold, confining air under compression within the mold cavity to compress the coating and expel the fluent component, and evacuating the mold cavity to expand the coating and expedite the removal in vapor form of the fluent component expelled during the compression period and thereafter.

3. The process of producing a hollow article from an organic plastic material which is maintained in a fluent condition by heat and pressure, comprising delivering a mold charge of predetermined weight of the plastic material into a mold which is being rotated, heating the mold and changing the plane of its axis of rotation so as quickly to spread the plastic material into a coating having the shape of the hollow article and the required thickness of wall at different points of the article, introducing a superheated gaseous medium into the mold cavity under pressure when the mold charge is being spread, and when spread cooling said medium to rigidify the plastic coating.

4. The process of producing a hollow article from a plastic material moldable under heat and pressure, comprising heating the material while spreading it as a film coating on the walls of a mold cavity by a rotational action of the mold, subjecting the film coating to the action of a compressing atmosphere which is heated to maintain the fluency of the material, and thereafter introducing a cooling atmosphere to rigidify the film and thus produce the hollow article.

5. The method of drying a film containing a volatile liquid, which comprises supporting the film on one side, exposing it on the other side to a drying medium, and subjecting said medium and said film to a plurality of fluctuations of pressure.

6. The method of drying a film consisting substantially of cellulose derivatives dispersed by and in solution with volatile substances, which comprises exposing a surface of the film to a drying medium, and subjecting the film and said medium in contact therewith to a plurality of fluctuations of pressure.

7. The method of drying a film containing a volatile liquid, comprising exposing a surface of the film to a drying medium, applying to the film radiant heat, and subjecting said medium and the film to a plurality of fluctuations of pressure.

8. The method of drying a film containing a volatile liquid, comprising exposing a surface of the film to a drying medium, applying radiant heat to the film through said surface, subjecting the film and said medium in contact therewith to a plurality of fluctuations of pressure, and moving said medium across the said surface.

9. The process of making and drying a film containing a volatile liquid and film-forming cellulose compounds, comprising spreading said compounds and said volatile liquid into a film by rotating a body thereof on a supporting surface, exposing the unsupported surface of the film to said drying medium, producing a plurality of fluctuations in the pressure of said medium during the drying operation, and moving said medium during the drying operation over the film from the circumference towards the axis of the film.

10. The process of making and drying a film of material comprising a volatile liquid and film-forming cellulose compounds, which comprises placing a predetermined amount of said material on a revolving surface, imparting rotation from said surface to said material and thereby spreading the material into film form, subjecting the unsupported side of the spread film to a drying medium, moving said medium from the circumference of the film towards and along the axis of the film away from the surface of the film during drying, and producing a plurality of fluctuations in the pressure of said medium and on said film during the drying operation.

11. The method of drying a film consisting substantially of cellulose derivatives dispersed by and in solution with volatile substances, which comprises contacting a surface of the film with a drying medium, producing a plurality of fluctuations of pressure upon the medium and the film, moving fresh drying medium into contact with the film and saturated drying medium away from the film, and dehydrating said medium before it comes in contact with said surface of the film.

12. The method of drying a film body, consisting substantially of one or more cellulose derivatives, plasticizers, and volatile liquids having varying boiling points, which comprises subjecting a surface of the film to a drying medium, producing a plurality of fluctuations in pressure on the medium and the film, and gradually increasing the successive pressures as the more volatile material is removed.

13. The method of drying a film, containing volatile material which comprises heating the film by radiant heat from a surface spaced from a surface of the film, passing a drying medium between said heating surface and said surface of the film, and subjecting said medium to fluctuations in pressure.

14. The method of drying a film containing volatile material, which comprises bringing a surface of the film in contact with a drying medium and heating the film by radiant heat passed through said medium and into the film.

15. The process of making and drying a film containing volatile liquid and a film forming material, which comprises spreading a predetermined quantity of said material by centrifugal force applied by a supporting surface in contact with one side of the film so formed, subjecting the other side of the film to a drying medium, and passing radiant heat through the drying medium and into the film and thereby heating the film during the drying operation.

16. The process of making an article from film forming material, which comprises spreading a film into the form of the desired article on a supporting surface, drying the film on said surface, mechanically raising a central portion of the film from the supporting surface, supplying air to the space beneath said raised portion, and removing the dried article by sub-atmospheric pressure on the side opposite from the supported surface.

17. The process of producing an article from film forming material, which comprises placing upon a surface of suitable shape a predetermined amount of material comprising volatile liquid and film forming cellulose materials which remain as a solid upon removal of the volatile liquid, rotating the surface and thereby spreading said predetermined amount of material into film form of the desired shape, during said rotation exposing the unsupported side of the film to a drying medium, and passing radiant heat through said drying medium into the film and thereby heating the film.

18. The process of producing a hollow article from a definite quantity of thermo-setting plastic material, which comprises extruding a measured quantity of the plastic material from a supply thereof as a unit body in a molten state and delivering said body into the cavity of a mold, spreading said body during a predetermined period as a unitary coating over the walls of said cavity, and then setting the said coating into a rigid state to produce the article therefrom by the application of additional heat to the coating and by simultaneously acting thereon with a compacting pressure communicated by a gaseous vehicle under super-atmospheric pressure.

19. The process of producing a hollow film wall article of soft collapsible structure from a fluent plastic material, which comprises delivering a measured quantity of the plastic material as a unit body into the bottom section of the cavity of a mold, spreading said body by centrifugal action as a unitary coating over the walls of said cavity, drying the said coating to make it solid, and removing it from the mold cavity by simultaneously applying an elevating force to the edge portion of the article to lift it from the mold cavity and pneumatic pressure between the walls of the mold cavity and the exterior face of the film to disengage the film from said walls.

20. The process of producing a hollow article from a thermo-plastic material which comprises delivering a definite quantity of the plastic material from a supply nozzle as a unit body directly to the bottom of a mold cavity, spreading all of the said body as a unitary coating on the walls of the mold cavity, applying heat to retain fluency in the plastic compound during the spreading period, then cooling the mold walls and introducing a cooling flow of air inside the mold cavity to rigidify the coating, following said operations lifting the rigidified coating by its edge portion to a point removed from the mold cavity by means of an auxiliary mold part, and thereafter severing the coating from said auxiliary mold part to produce the article.

ENOCH T. FERNGREN.